(12) United States Patent
Janick

(10) Patent No.: US 12,466,709 B1
(45) Date of Patent: Nov. 11, 2025

(54) ENHANCED SHOPPING CART

(71) Applicant: Nick Janick, Belle River (CA)

(72) Inventor: Nick Janick, Belle River (CA)

( * ) Notice: Subject to any disclaimer, the term of this patent is extended or adjusted under 35 U.S.C. 154(b) by 0 days.

(21) Appl. No.: 18/738,001

(22) Filed: Jun. 8, 2024

Related U.S. Application Data

(63) Continuation-in-part of application No. 17/338,855, filed on Jun. 4, 2021, now abandoned, which is a continuation-in-part of application No. 15/817,175, filed on Nov. 18, 2017, now abandoned, application No. 18/738,001, filed on Jun. 8, 2024 is a continuation-in-part of application No. 29/796,235, filed on Jun. 21, 2021.

(51) Int. Cl.
*B66F 7/24* (2006.01)
*B66F 7/28* (2006.01)

(52) U.S. Cl.
CPC .............. *B66F 7/243* (2013.01); *B66F 7/28* (2013.01)

(58) Field of Classification Search
CPC .......... B66F 7/243; B66F 7/28; B62B 3/1416
See application file for complete search history.

(56) References Cited

U.S. PATENT DOCUMENTS

| | | | | |
|---|---|---|---|---|
| 4,034,539 | A | * | 7/1977 | Economy .............. B62B 3/1428 40/308 |
| D357,784 | S | * | 4/1995 | Ince ....................... B62B 5/069 D34/27 |
| 6,453,588 | B1 | * | 9/2002 | Lykens ................. B62B 3/1416 40/308 |
| 9,126,616 | B2 | * | 9/2015 | Crum .................... B62B 3/1416 |
| 9,637,152 | B2 | * | 5/2017 | Dyer ..................... B62B 3/1468 |
| 2008/0248712 | A1 | * | 10/2008 | Gressianu ............ A63H 33/006 446/227 |

\* cited by examiner

*Primary Examiner* — Seahee Hong
(74) *Attorney, Agent, or Firm* — Gugliotta & Gugliotta LPA

(57) ABSTRACT

A tray element attachment for a shopping cart is provided. The tray affixes to the cart handle and an upper surface. A first receptacle accepts a first interactive device positionally oriented toward the seat occupant. A second receptacle accepts a second interactive device oriented the user pushing the cart by the handle. Each interactive device forms a mobile tablet computer that may be wirelessly connected to the internet and includes mobile application software. The occupant of the seat may access games and entertainment function applications.

13 Claims, 5 Drawing Sheets

ENHANCED SHOPPING CART

RELATED APPLICATIONS

There present invention is a Continuation in Part of U.S. application Ser. No. 17/693,472 filed on Mar. 14, 2022, which is a Continuation in Part of U.S. application Ser. No. 15/817,175, filed on Nov. 18, 2017. Additional applications of related continuity are further disclosed as part of the Application Data Sheet filed pursuant to 37 C.F.R. § 1.76. All Related Applications are incorporated by reference as if fully rewritten herein.

BACKGROUND OF THE INVENTION

1. Field of the Invention

The present invention relates generally to shopping carts and, more particularly, to a shopping cart enhancement that including online video tools and entertainment devices.

2. Description of the Related Art

Shopping can be hectic no matter the conditions. Whether it's the mob scene of Black Friday or just your average day at the mall, long lines can leave a shopper, and especially one's kids feeling bored.

Children-friendly shopping carts exist in some form. Whether outfitted in the theme of a police cart, fire truck or other child engaging themes, such carts are intended to function primarily as a shopping cart, and secondarily in order to provide engagement or entertainment for children.

However, while the mere ride in a decorated cart may provide some interest, such an activity is no longer highly engaging for children that are otherwise inundated with interactive electronics, whether television, video games or interactive games or smart device application. Consequently, a need exists for a child friendly shopping cart that includes interactive on-line enhancements.

SUMMARY OF THE INVENTION

It is thus an object of the present invention to provide a shopping cart enhancement that facilitates inclusion of interactive on-line capabilities.

It is a feature of the present invention to provide a shopping cart tray adapted with a network connected portable computing devices capable of running games or similar smart device applications.

It is a further feature of the present invention to provide additional computing or network tools adapted to assist the shopper.

The present invention provides for a tray element for attachment to a shopping cart by affixed to the cart's handle structure. The tray element forms a base unit having an upper surface. The upper surface forms a first receptacle for accepting a first interactive device that is positionally oriented on the tray such as to facilitate viewing and interaction from an occupant of the seat. The first interactive device may include a first graphical user interface in the form of a mobile tablet computer that may be wirelessly connected to the internet and includes mobile application software for providing games and entertainment function applications for entertainment of interaction with the occupant of the seat. The upper surface further forms a second receptacle for accepting a second interactive device that is positionally oriented on the tray such as to facilitate the view and interaction from a user pushing the cart by the handle. The second interactive device may also include a mobile tablet computer that may be wirelessly connected to the internet for affecting mobile application software for use by and interaction with the user of the cart. The two interactive devices may be molded or integrated into the upper surface.

It is an object of the present invention to facilitate a shopper to access online tools, such as an online shopping list, in an ergonomically convenient manner.

It is another object of the present invention to facilitate entertainment of a shopper's child in order to occupy the child during the shopping event.

It is a further object of the present invention to allow a retailer to improve its customers' shopping experiences, while further allowing the delivery of mobile computing applications and/or harvesting relevant shopper data.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
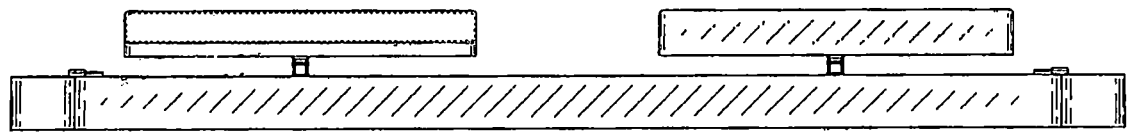
FIG. 1 is a front top perspective view of a shopping cart enhancement according to a preferred embodiment of the present invention.
Figure 2:
FIG. 2 is a front bottom perspective view thereof.
Figure 3:
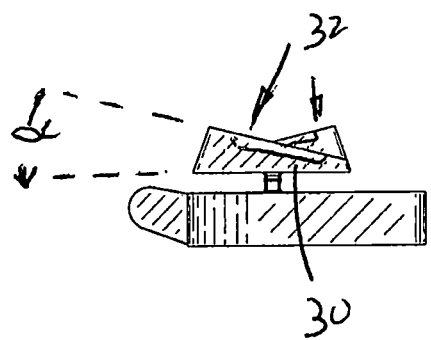
FIG. 3 is a top plan view thereof.
Figure 4:
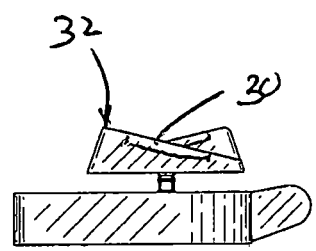
FIG. 4 is a bottom plan view thereof.
Figure 5:
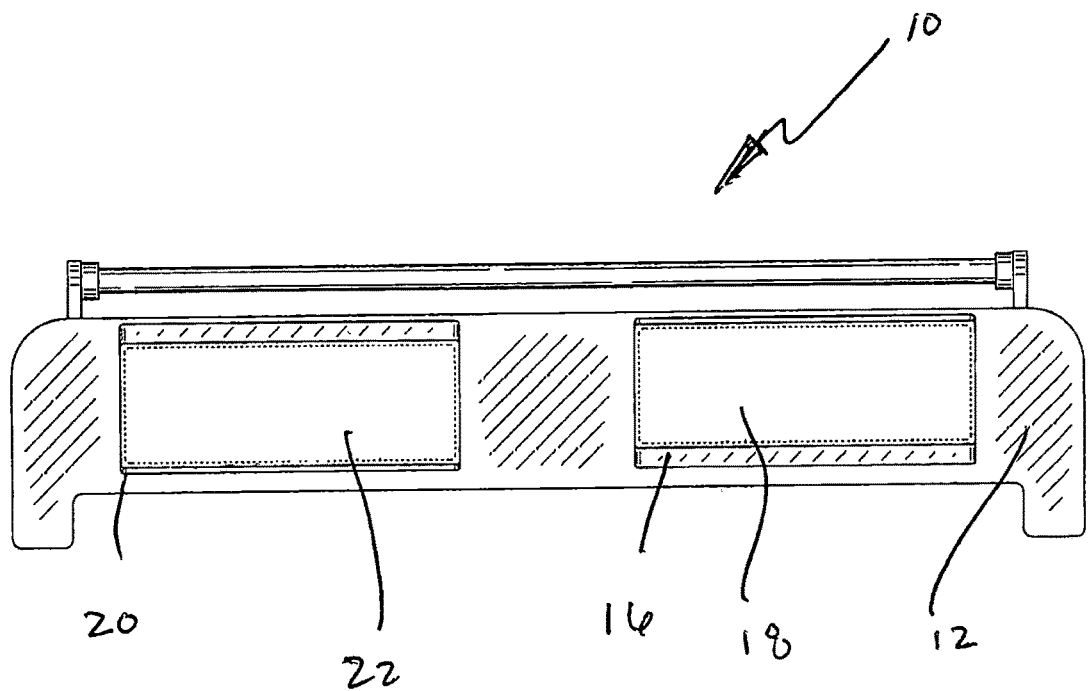
FIG. 5 is a front elevational view thereof.
Figure 6:
FIG. 6 is a rear elevational view thereof.
Figure 6:
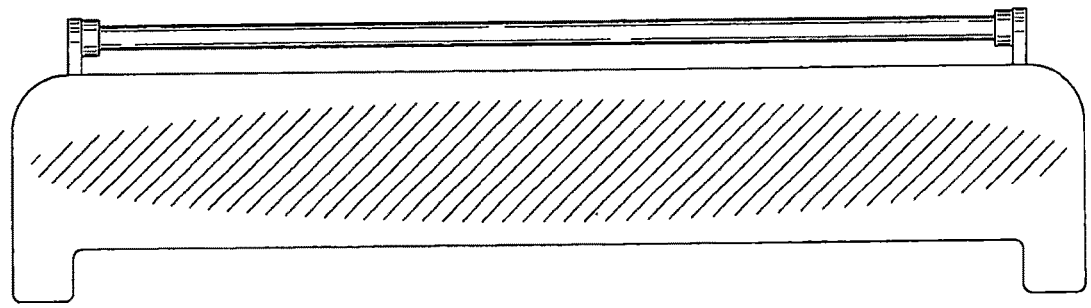
Figure 7:
FIG. 7 is a left side elevational view thereof.
Figure 8:
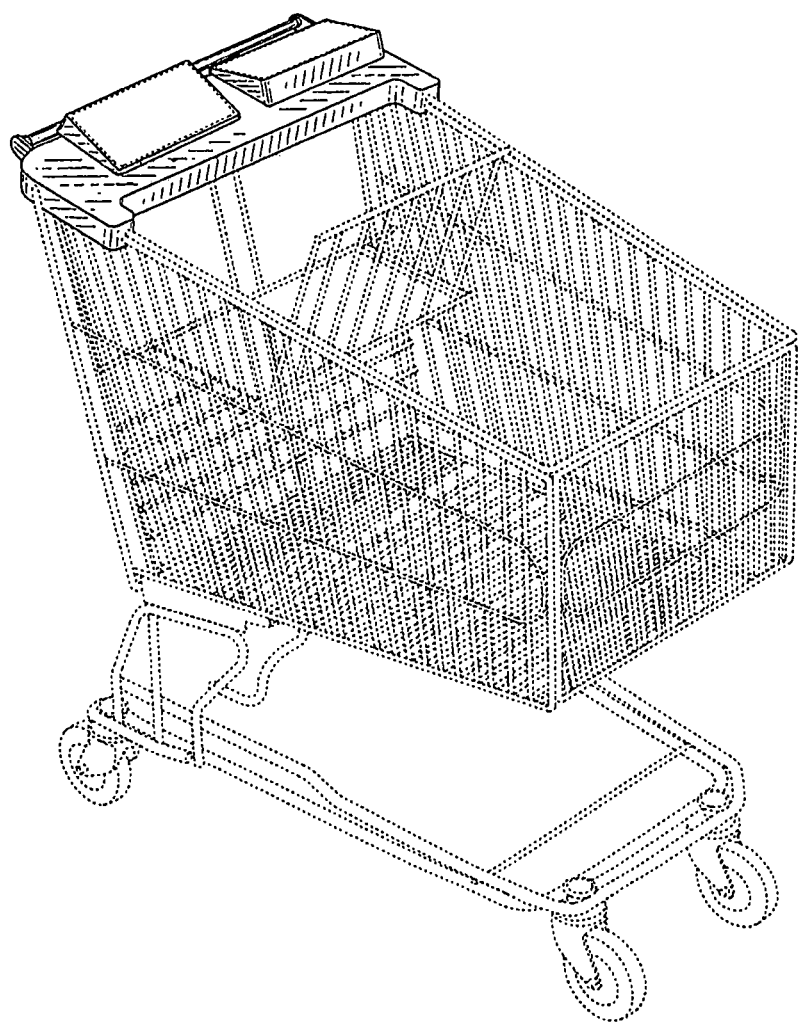
FIG. 8 is a right side elevational view thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, an shopping cart enhancement, generally noted as 10, in shown according to the preferred embodiment of the present invention. The enhancement 10 forms a tray having an upper surface 12 and a lower surface 14 that are received onto an otherwise conventionally available shopping cart (not shown). For purposes of the present invention the shopping cart may form a wheeled base supporting an upwardly opening basket mounted on the base, with the basket bounded by a pair of opposed side wall, and a handle structure fixedly secured to said basket and projecting rearwardly therefrom. The handle structure may further be adapted to permit the movement of child seat structure between a deployed use position and a retracted storage position, with the deployed use position providing a seat and back that is extended to permit the placement of a toddler or child safely therein. The retracted storage position may permit nesting of like carts in a cooperating manner.

The upper surface 12 forms a first receptacle 16 for accepting a first interactive device 18 that is positionally oriented on the tray 10 such as to facilitate viewing and interaction from an occupant of the seat. The upper surface 12 further forms a second receptacle 20 for accepting a second interactive device 22 that is positionally oriented on the tray 10 such as to facilitate the view and interaction from a user pushing the cart by the handle.

Each receptacle 16/20 may be provided in a variety of forms and may include attachment mechanisms that would become apparent to those having ordinary skill in the relevant art in light of the present teachings. However, by way of example of the preferred embodiment, and not meant as a limitation, the receptacles 16/20 may form of a recess 30 surrounded by a perimeter lip 32. The recess 30 may be formed in the shape a mobile tablet computer such as an iPad® from Apple Computers, a Galaxy Tab® from Samsung, or other similar or equivalent other mobile tablet computer.

The first interactive device 18 may include a first graphical user interface in the form of the mobile tablet computer that may be wirelessly connected to the internet and include mobile application software for providing games and entertainment function applications for entertainment of interaction with the occupant of the seat. The second interactive device 22 may also include a mobile tablet computer that may be wirelessly connected to the internet for affecting mobile application software for use by and interaction with the user of the cart.

The two interactive devices 18/22 may be molded or integrated into its respective receptacle 16/20. Alternately, each interactive device 18/22 may be snap fit, attached or otherwise received connectedly into its respective receptacle 16/20.

In a preferred configuration, the receptacle 16 may be positionally oriented relative to the upper surface 12 such as to facilitate viewing and interaction from an occupant of the seat. Such an orientation may be such that the receptacle 18 is formed at an acute angle "α" relative to a general horizontal plane formed by the upper surface 12. In a preferred embodiment the angle "α" may be between about 15° and about 30°.

Similarly in a preferred configuration, the receptacle 20 may be positionally oriented relative to the upper surface 12 such as to facilitate viewing and interaction from a user of the shopping cart. Such an orientation may be such that the receptacle 20 is formed at a similar acute angle "α" relative to a general horizontal plane formed by the upper surface 12. In a preferred embodiment the angle "α" may also be between about 15° and about 30°.

2. Operation of the Preferred Embodiment

In operation a user would deploy a cart in a manner similar as with any otherwise conventional shopping cart. A child or toddler may further be positioned within the seat. The tray 10 may be affixed to or already affixed to the shopping cart such that the second interactive device 22 is positionally oriented on the tray 10 such as to facilitate the view and interaction from a user pushing the cart by the handle. The second interactive device 22 may provide a second graphical user interface on the mobile tablet computer that may be wirelessly connected to the internet. As should be apparent to a person having ordinary skill in the relevant art, in light of the present teachings, such wireless communication may be through Wi-Fi™, Bluetooth™ or other similar or equivalent wireless protocol (such as, by way of non-limiting example, Z-wave, Zigbee, 60 GHz protocols, or the like). Further mobile application software can provide various functions and features the user. It is envisioned that such functions may specifically include a calculator, a note pad, or access to Google®, Netflix® or Youtube®. Further any other smart device Apps may be available to the user upon executing of a login and/or authentication process.

The first interactive device provides a first graphical user interface in the form of a mobile tablet computer that may also be wirelessly connected to the internet. As should be apparent to a person having ordinary skill in the relevant art, in light of the present teachings, such wireless communication may be through Wi-Fi™, Bluetooth™ or other similar or equivalent wireless protocol (such as, by way of non-limiting example, Z-wave, Zigbee, 60 GHz protocols, or the like). A mobile application software can provide various games or entertainment functions or applications to allow for the entertainment of or interaction with the occupant of the seat.

It is anticipated that payment of a security deposit may be made through a credit card or other electronic payment mechanisms may then both secure the cart until its return as well as be used for any premium applications that may require additional costs. A child positioned in the seat may then interact with and engage the first interactive device 16. The user pushing the handle may then interact with and engage the second interaction device 20. Such operations can provide entertainment for a child, as well as entertainment or additional electronic tools that may assist during shopping (i.e., price comparison, calculator function, etc.).

Upon returning the cart it is envisioned that the user would receive a refund for any deposit, less any costs accrued during its operation.

It is further anticipated that other methods of monetizing the use of the present device may be provided, such as an advertising model or through the acquisition and renting of user data.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. An interactive shopping cart tray comprising:
   a tray having an upper surface and a lower surface, the lower surface configured to be received onto a shopping cart about a handle;
   the upper surface forming a first receptacle and a second receptacle, each receptacle comprising dimensions and structural support specifically designed to accommodate and secure a portable electronic device, wherein the first receptacle is positionally oriented to facilitate viewing and interaction from an occupant of a seat of the shopping cart;
   a first interactive device positioned within the first receptacle forming a first recess surrounded by a first perimeter lip;
   a second interactive device positioned within the second receptacle forming a second recess surrounded by a second perimeter lip;
   said first receptacle and said second receptacle each configured at an acute angle relative to the upper surface of the tray and said second receptacle configured at a second acute angle relative to the upper surface of the tray to provide an ergonomic viewing and interaction angle for the mobile tablet electronic devices.

2. The interactive shopping cart tray of claim 1, wherein the first interactive device and/or the second interactive device is wirelessly connected to the internet and includes mobile application software specifically tailored for shopping assistance including interactive shopping lists, product information retrieval, and in-store navigation aids.

3. The interactive shopping cart tray of claim 2, wherein the second acute angle is different from the first acute angle and the second acute angle is specifically optimized for ergonomic viewing and interactive efficiency based on a selected user height and shopping cart dimensions.

4. The interactive shopping cart tray of claim 1, wherein the first acute angle is between about 15° and about 30°.

5. The interactive shopping cart tray of claim 3, wherein the second acute angle is between about 15° and about 30°.

6. The interactive shopping cart tray of claim 1, consisting essentially of a unitary molded plastic member, wherein the member is designed with enhanced structural integrity to securely support the weight and interaction forces associated with the first and second interactive devices.

7. The interactive shopping cart of claim 2, consisting essentially of a unitary molded plastic member, wherein the member is designed with enhanced structural integrity to securely support the weight and interaction forces associated with the first and second interactive device.

8. The interactive shopping cart tray of claim 1, wherein the first and second interactive devices are securable within their respective receptacles using a locking mechanism to prevent unauthorized removal.

9. The interactive shopping cart tray of claim 1, wherein the first and/or second interactive devices include sensors for tracking user interactions and providing analytics to retailers for improving shopping experience and product placement.

10. The interactive shopping cart tray of claim 9, wherein the sensors of the first and/or second interactive devices include at least one of: a touchscreen sensor, a motion sensor, or an eye-tracking sensor.

11. The interactive shopping cart tray of claim 1, wherein the first and/or second interactive devices are capable of wireless charging when docked in their respective receptacles.

12. The interactive shopping cart tray of claim 11, wherein the wireless charging is enabled through induction charging of the first and/or second interactive devices is enabled through induction charging technology integrated within the tray.

13. The interactive shopping cart tray of claim 1, further comprising an adjustable mechanism to change the orientation of the first and/or second receptacles wherein the adjustable mechanism allows for tilting or swiveling of the first and/or second receptacles.

* * * * *